United States Patent
Bachl et al.

(10) Patent No.: US 8,086,257 B2
(45) Date of Patent: Dec. 27, 2011

(54) DEDICATED CONTROL CHANNEL DETECTION FOR ENHANCED DEDICATED CHANNEL

(75) Inventors: Rainer Bachl, Nuremberg (DE); Francis Dominique, Rockaway, NJ (US); Hongwei Kong, Denville, NJ (US); Walid E. Nabhane, Bedminster, NJ (US)

(73) Assignee: Alcatel Lucent, Paris (FR)

( * ) Notice: Subject to any disclaimer, the term of this patent is extended or adjusted under 35 U.S.C. 154(b) by 243 days.

(21) Appl. No.: 11/201,364

(22) Filed: Aug. 11, 2005

(65) Prior Publication Data

US 2007/0036104 A1 Feb. 15, 2007

(51) Int. Cl.
*H04B 7/00* (2006.01)

(52) U.S. Cl. ........ 455/515; 375/130; 375/340; 375/152; 375/148; 375/342

(58) Field of Classification Search ............ 375/130, 375/148, 152, 340–342; 455/434, 515
See application file for complete search history.

(56) References Cited

U.S. PATENT DOCUMENTS

| | | | | | |
|---|---|---|---|---|---|
| 5,450,453 | A | * | 9/1995 | Frank | 375/130 |
| 6,018,546 | A | * | 1/2000 | Rege | 375/148 |
| 6,205,334 | B1 | * | 3/2001 | Dent | 455/434 |
| 6,208,699 | B1 | * | 3/2001 | Chen et al. | 375/340 |
| 6,985,752 | B2 | * | 1/2006 | Takano et al. | 455/522 |
| 7,230,941 | B2 | * | 6/2007 | Odenwalder et al. | 370/342 |
| 7,251,497 | B2 | * | 7/2007 | Jalloul et al. | 455/522 |
| 7,406,070 | B2 | * | 7/2008 | Nilsson | 370/342 |
| 2002/0057730 | A1 | * | 5/2002 | Karlsson et al. | 375/152 |
| 2003/0152169 | A1 | * | 8/2003 | Chen | 375/340 |
| 2004/0001556 | A1 | * | 1/2004 | Harrison et al. | 375/267 |
| 2004/0091067 | A1 | * | 5/2004 | Ammer et al. | 375/341 |
| 2004/0153950 | A1 | * | 8/2004 | Tapaninen et al. | 714/776 |
| 2004/0203463 | A1 | * | 10/2004 | Chen et al. | 455/67.13 |
| 2004/0240529 | A1 | | 12/2004 | Leonard et al. | |
| 2006/0146889 | A1 | * | 7/2006 | Malkamaki et al. | 370/506 |

OTHER PUBLICATIONS

International Search Report and Written Opinion dated Jan. 12, 2006.
"Digital cellular telecommunications system (Phase 2+); Discontinuous Transmission (DTX) for enhanced full rate speech traffic channels" 3GPP TS 46.081 version 6.0.0 Release 6.
"Digital cellular telecommunications system (Phase 2+); Full rate speech; Discontinuous Transmission (DTX) for full rate speech traffic channels" GSM 06.31 version 8.0.1 Release 1999.
"Digital cellular telecommunications system (Phase 2+); Full rate speech; Voice Activity Detector (VAD) for full rate speech traffic channels" GSM 06.32 version 8.0.1 Release 1999.
Chinese Office Action dated Dec. 31, 2010 for corresponding Chinese application.
Office Action dated Aug. 23, 2011 by the European Patent Office for Application No. 06 788 633.3.

* cited by examiner

*Primary Examiner* — Vladimir Magloire
(74) *Attorney, Agent, or Firm* — Harness, Dickey & pierce

(57) ABSTRACT

In a method of detecting a signal, a control channel associated with a physical channel may be decoded to produce at least one decoding metric. A control channel signal on the control channel may then be detected based on the decoding metric.

20 Claims, 4 Drawing Sheets

DEDICATED CONTROL CHANNEL DETECTION FOR ENHANCED DEDICATED CHANNEL

BACKGROUND OF THE INVENTION

A cellular communications network typically includes a variety of communication nodes coupled by wireless or wired connections and accessed through different types of communications channels. Each of the communication nodes includes a protocol stack that processes the data transmitted and received over the communications channels. Depending on the type of communications system, the operation and configuration of the various communication nodes can differ and are often referred to by different names. Such communications systems include, for example, a Code Division Multiple Access 2000 (CDMA2000) system and a Universal Mobile Telecommunications System (UMTS).

Third generation wireless communication protocol standards (e.g., 3GPP-UMTS, 3GPP2-CDMA2000, etc.) may employ a dedicated traffic channel in the uplink (e.g., a communication flow between a mobile station (MS) or User Equipment (UE), hereinafter referred to as a user, and a base station (BS) or NodeB. The dedicated channel may include a data part (e.g., a dedicated physical data channel (DPDCH) in accordance with UMTS Release 4/5 protocols, a fundamental channel or supplemental channel in accordance with CDMA2000 protocols, etc.) and a control part (e.g., a dedicated physical control channel (DPCCH) in accordance with UMTS Release 4/5 protocols, a pilot/power control sub-channel in accordance with CDMA2000 protocols, etc.).

Newer versions of these standards, for example, Release 6 of UMTS provide for high data rate uplink channels referred to as enhanced dedicated channels (E-DCHs). An E-DCH may include an enhanced data part (e.g., an E-DCH dedicated physical data channel (E-DPDCH) in accordance with UMTS protocols) and an enhanced control part (e.g., an E-DCH dedicated physical control channel (E-DPCCH) in accordance with UMTS protocols).

FIG. 1 illustrates a conventional wireless communication system 100 operating in accordance with UMTS protocols. Referring to FIG. 1, the wireless communication system 100 may include a number of NodeBs such as NodeBs 120, 122 and 124, each serving the communication needs of a first type of user 110 and a second type of user 105 in their respective coverage area. The first type of user 110 may be a higher data rate user such as a UMTS Release 6 user, referred to hereinafter as an enhanced user. The second type of user may be a lower data rate user such as a UMTS Release 4/5 user, referred to hereinafter as a legacy user. The NodeBs are connected to an RNC such as RNCs 130 and 132, and the RNCs are connected to a MSC/SGSN 140. The RNC handles certain call and data handling functions, such as, autonomously managing handovers without involving MSCs and SGSNs. The MSC/SGSN 140 handles routing calls and/or data to other elements (e.g., RNCs 130/132 and NodeBs 120/122/124) in the network or to an external network. Further illustrated in FIG. 1 are interfaces Uu, Iub, Iur and Iub between these elements.

An example of a frame structure for the enhanced dedicated channels (e.g., E-DPCCH and E-DPDCH) in the uplink direction is illustrated in FIG. 2. Each frame 200 may have a length of, for example, 10 milliseconds (ms) and may be partitioned into 5 sub-frames each including 3 slots. Each slot 205 may have a length of, for example, 2560 chips, and may have a duration of, for example, ⅔ ms. Consequently, each sub-frame may have a duration of 2 ms.

As discussed above, an E-DCH includes an E-DPDCH 240 and an E-DPCCH 220, and each of the E-DPCCH 220 and the E-DPDCH 240 may be code multiplexed.

The E-DPCCH 220 carries control information for an associated E-DPDCH 240. This control information includes three components: a re-transmission sequence number (RSN), a transport format indicator (TFI) and a happy bit. The RSN indicates the transmission index of an associated packet transmitted on the E-DPDCH, has a maximum value of 3 and is represented by two bits. The TFI indicates the data format for the transport channel carried by the associated E-DPDCH (e.g., transport block size, transmission time interval (TTI), etc.) and is represented by 7 bits. The happy bit is a binary indicator, which may be used by a UE to inform one or more NodeBs whether the UE is satisfied with the current setup of the E-DCH channels and is represented by a single bit. For example, UE 110 of FIG. 1 may use this indicator to inform one of the NodeBs 120/122/124 that the UE 110 may handle greater data capacity. In other words, the happy bit is a rate increase request bit.

FIG. 3 illustrates a conventional UMTS uplink transmitter 300 located at the enhanced UE 110 of FIG. 1 and a receiver 350 located at one of the NodeBs 120/122/124. The conventional transmitter 300 and receiver 350 of FIG. 3 may transmit and receive E-DCHs.

As shown in FIG. 3, data associated with an upper layer enhanced dedicated transport channel (E-DCH) may be processed into E-DPDCH frames at the transmission channel processing block 303. The frames may be binary phase shift keying (BPSK) modulated and orthogonally spread at the modulation and orthogonal spreading unit 304. The spread modulated frames are received by the gain unit 315 where an amplitude of the spread modulated frames may be adjusted. A combiner 320 receives the output of the gain unit 315.

Still referring to FIG. 3, the 2 RSN bits, the 7 TFI bits and the 1 happy bit are mapped into a 10-bit E-DPCCH word, which may be control information for an associated E-DPDCH frame having a TFI of, for example, 2 ms or 10 ms. The 10-bit E-DPCCH word may then be coded into a 30-bit coded sequence at an FEC unit 301. That is, for example, the 10-bit E-DPCCH word associated with a single E-DPDCH frame is first coded into a 32-bit E-DPCCH codeword using a (32, 10) sub-code of the second order Reed-Muller code. The 32-bit codeword is then punctured to (30, 10) code to generate the 30 coded symbols (in this case 1 bit will represent 1 symbol) to be transmitted. These 30 coded symbols are transmitted in one sub-frame (e.g., 3 slots with 10-bits per slot).

Returning to FIG. 3, the 30-bit coded sequence is modulated at a BPSK Modulator 305 and orthogonally spread at an orthogonal spreading unit 310. The output from the orthogonal spreading unit 310 is gain adjusted at a gain unit 316 and output to the combiner 320. Similar to the above E-DPCCH, well-known DPCCH frames used in determining, for example, channel estimates, are modulated at a BPSK Modulator 306, and the modulated frames are orthogonally spread at an orthogonal spreading unit 311. The spread modulated frames are received by a gain unit 317 where an amplitude of the spread modulated frames may be adjusted.

The outputs of each of the gain units 315, 316 and 317 are combined (e.g., code-division multiplexed) into a combined signal by a combiner unit 320. The combined signal is scrambled and filtered by a shaping filter 325, and the output of the shaping filter 325 is sent to the receiver 350 via a propagation channel 330 (e.g., over the air).

At the receiver 350, the transmitted signal is received over the propagation channel 330, and input to the E-DPDCH processing block 335, E-DPCCH soft-symbol generation block 345 and a DPCCH channel estimation block 355. As is well-known in the art, the DPCCH channel estimation block 355 generates channel estimates using pilots transmitted on the DPCCH. The channel estimates may be generated in any well-known manner, and will not be discussed further herein for the sake of brevity. The channel estimates generated in the DPCCH channel estimation block 355 may be output to each of the E-DPDCH processing block 335 and the E-DPCCH soft-symbol generation block 345.

At the soft-symbol generation block 345, the received control signal may be de-scrambled, de-spread, and de-rotated/de-multiplexed to generate a sequence of soft-symbols. The E-DPCCH soft-symbols may represent an estimate of the received signal, or in other words, an estimate of the 30 symbols transmitted by the transmitter 300. The E-DPCCH soft-symbols may be further processed to recover the transmitted E-DPCCH word.

The E-DPCCH soft-symbols are output to an E-DPCCH discontinuous transmission (DTX) detection unit 365. The E-DPCCH DTX detection unit 365 determines whether the signal received on the E-DPCCH is actually present using a thresholding operation.

For example, the E-DPCCH DTIX detection unit 365 may normalize a signal energy for a received E-DPCCH frame (e.g., the signal energy over a given TTI of 2 ms) and compare the normalized signal energy to a threshold. If the normalized signal energy is larger than the threshold, the E-DPCCH DTX detection unit 365 determines that a control signal is present on the E-DPCCH; otherwise the E-DPCCH DTX detection unit 365 determines that a control signal is not present on the E-DPCCH and, subsequently, declares a discontinuous transmission.

If the E-DPCCH DTX detection unit 365 detects that a control signal is present on the E-DPCCH, the soft-symbols output from the soft-symbol generation block 345 are processed by the E-DPCCH decoding block 375 to recover (e.g., estimate) the 10-bit E-DPCCH word transmitted by the transmitter 300.

For example, in recovering the transmitted 10-bit E-DPCCH word, the E-DPCCH decoding block 375 may determine a correlation value or correlation distance, hereinafter referred to as a correlation, between the sequence of soft-symbols and each 30-bit codeword in a subset (e.g., 2, 4, 8, 16, 32, etc.) of all 1024 possible E-DPCCH codewords, which may have been transmitted by the transmitter 300. This subset of codewords may be referred to as a codebook. After determining a correlation between the sequence of soft-symbols and each of the codewords in the codebook, the E-DPCCH decoding block 375 selects the 10-bit E-DPCCH word corresponding to the 30-bit E-DPCCH codeword, which has the highest correlation to the E-DPCCH soft-symbols. The 10-bit E-DPCCH word is then output to the E-DPDCH processing block 335 for use in processing the E-DPDCH.

The conventional E-DPCCH processing as shown in FIG. 3 is used to generate E-DPCCH performance results and/or set conformance test requirements for Release 6 UMTS standards. However, the performance obtained with this E-DPCCH processing scheme may be dictated by the E-DPCCH DTX detection unit 365 of FIG. 3, and may not provide sufficient performance. For example, if an E-DCH has a TTI length of 2 ms, a higher transmit power may be needed for an E-DPCCH control signal to be detected at the E-DPCCH DTX detection unit 365. On the other hand, the E-DPCCH decoding block 375 may successfully decode E-DPCCH control signals having a lower power level than that required by the E-DPCCH DIX detection unit 365.

Accordingly, since the E-DPCCH decoding block 375 only decodes the E-DPCCH if the E-DPCCH DTX detection unit 365 indicates that a control signal is present on the E-DPCCH, the E-DPCCH transmit power must be set based on the performance requirements of the E-DPCCH detection. This may result in higher power consumption and/or higher interference to other users.

SUMMARY OF THE INVENTION

In an example embodiment of the present invention, a method of detecting a signal may include decoding a control channel associated with a physical channel to produce at least one decoding metric and detecting whether a control channel signal is present on the control channel based on the decoding metric.

In another example embodiment of the present invention, an apparatus for detecting a signal may include a decoder and a detector. The decoder may decode a control channel associated with a physical channel to produce at least one decoding metric and the detector may detect whether a control channel signal is present on the control channel based on the decoding metric.

In example embodiments of the present invention, the decoding metric may be a correlation representing the likelihood that a respective codeword among a plurality of codewords may be present in a signal received on the control channel.

In example embodiments of the present invention, the decoding metric may be a highest correlation for the plurality of codewords.

In example embodiments of the present invention, an energy metric may be calculated based on the highest correlation, and a control channel signal present on the control channel may be detected based on the energy metric.

In example embodiments of the present invention, the highest correlation may be squared to generate an energy value. The energy value may be normalized to generate the energy metric. The normalized energy value may be generated based on a signal energy and noise energy for a frame received on the control channel.

In example embodiments of the present invention, a control channel signal present on the control channel may be detected based on the energy metric and a threshold. The threshold may be dependent on a number of the codewords in the plurality of codewords associated with the control channel, may be dependent on a transport format set size associated with a frame received on the control channel and/or may be determined based on a maximum number of transmissions for a transport channel packet.

In example embodiments of the present invention, a control channel signal present on the control channel may be detected if the energy metric is greater than or equal to the threshold.

In example embodiments of the present invention, an indicator indicative of whether the control channel signal is present on the control channel may be generated based on the detecting step, and data received on a data channel associated with the control channel may be processed based on the generated indicator.

In example embodiments of the present invention, the decoder may be an enhanced decoder and the detector may be a discontinuous transmission detector. The physical channel may be an enhanced dedicated channel.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EXAMPLE EMBODIMENTS

As discussed above with regard to FIG. 1, a multi-user environment may include at least a first type of user 110, which may be a higher data rate user such as a UMTS Release 6 user, referred to herein as an enhanced user, and a second type of user 105, which may be a lower data rate user such as a UMTS Release 4/5 user, referred to herein as a legacy user. The enhanced users 10 and the legacy users 105 transmit signals to a serving NodeB 120/122/124 simultaneously over enhanced dedicated channels (e.g., E-DPDCHs and E-DPCCH) and dedicated channels (e.g., DPDCHs and DPCCH), respectively. As discussed above, these enhanced and legacy dedicated physical channels may be transmitted over respective propagation channels, each of which may include multiple propagation paths.

Figure 1:
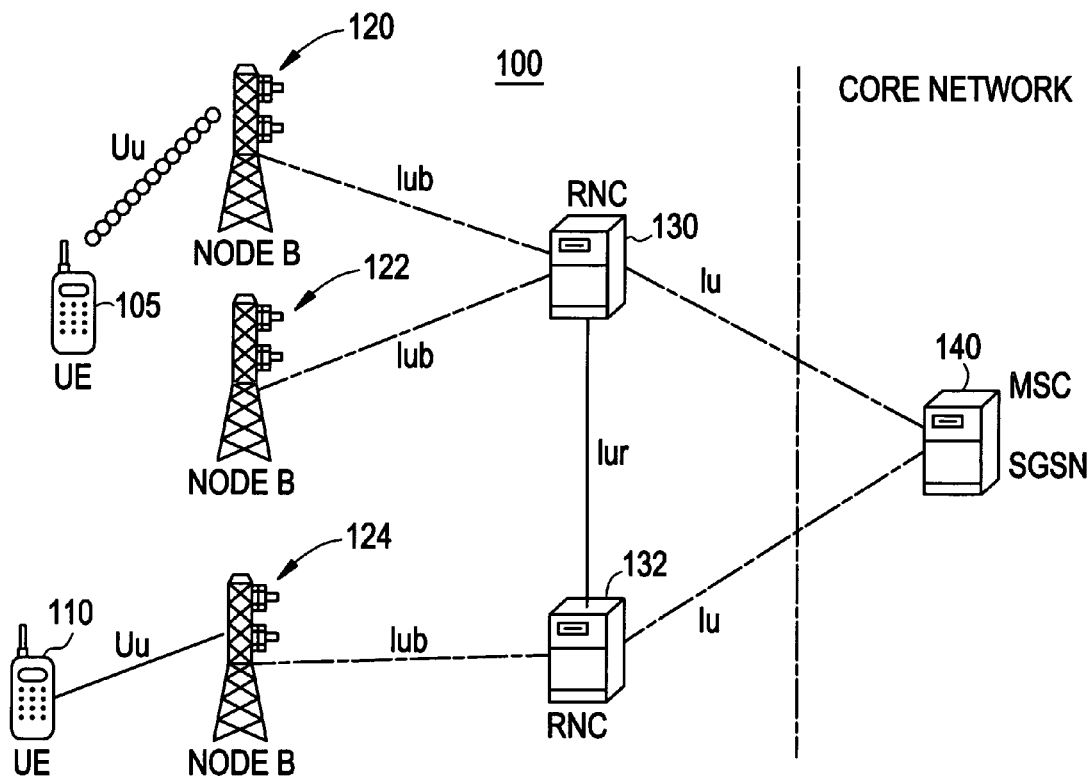
FIG. 1 illustrates a conventional wireless communication system 100 operating in accordance with UMTS protocols.
Figure 2:
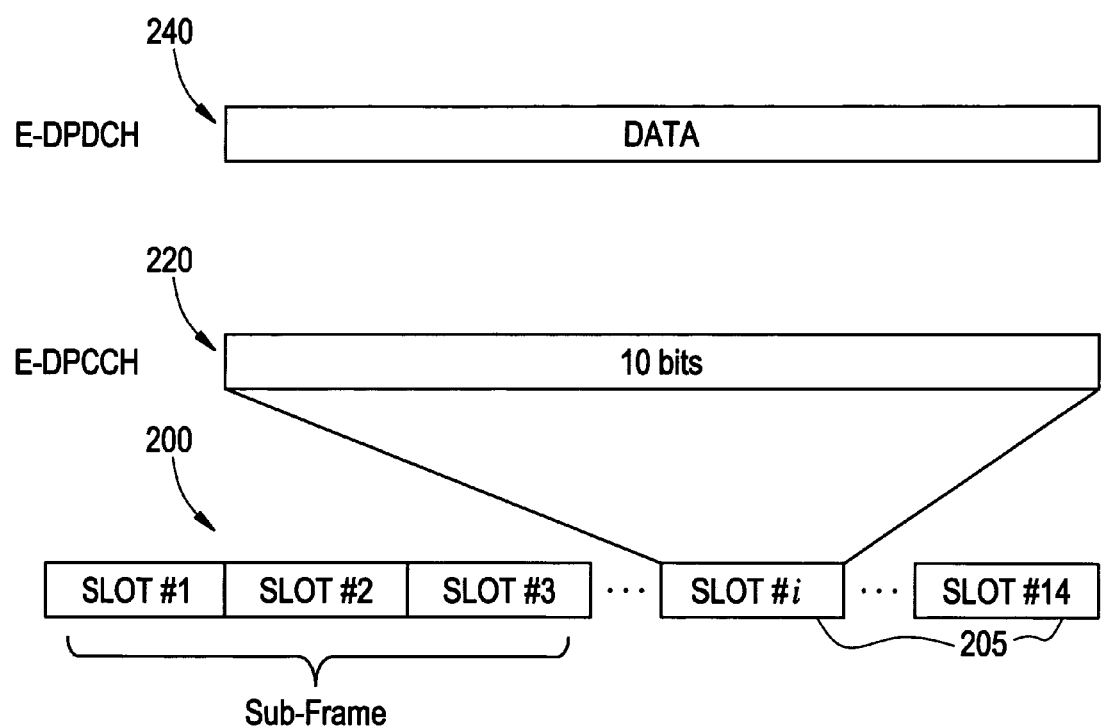
FIG. 2 illustrates an example of a conventional frame structure of enhanced uplink dedicated physical channels.
Figure 3:
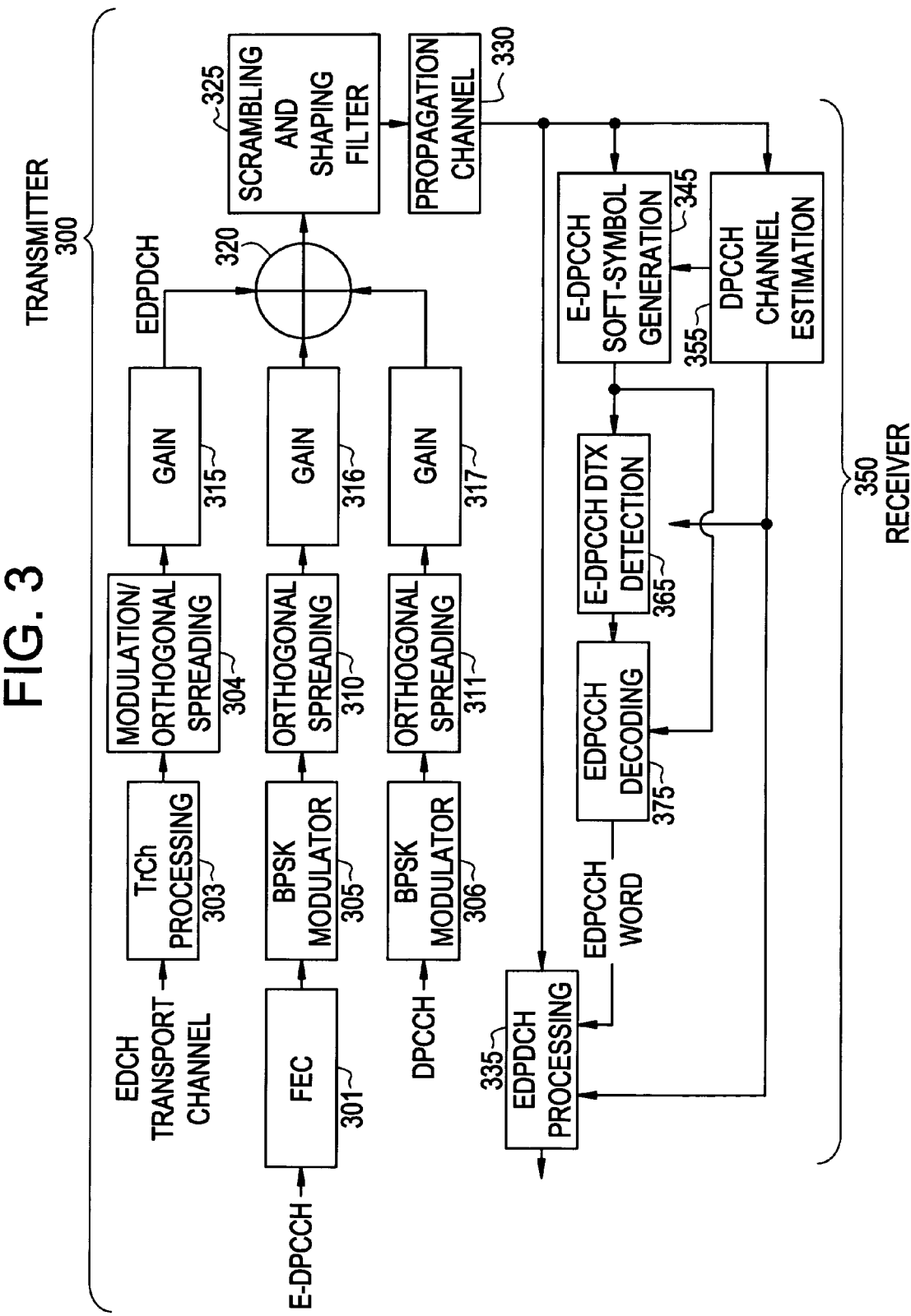
FIG. 3 illustrates a conventional UMTS uplink transmitter and receiver.
Figure 4:
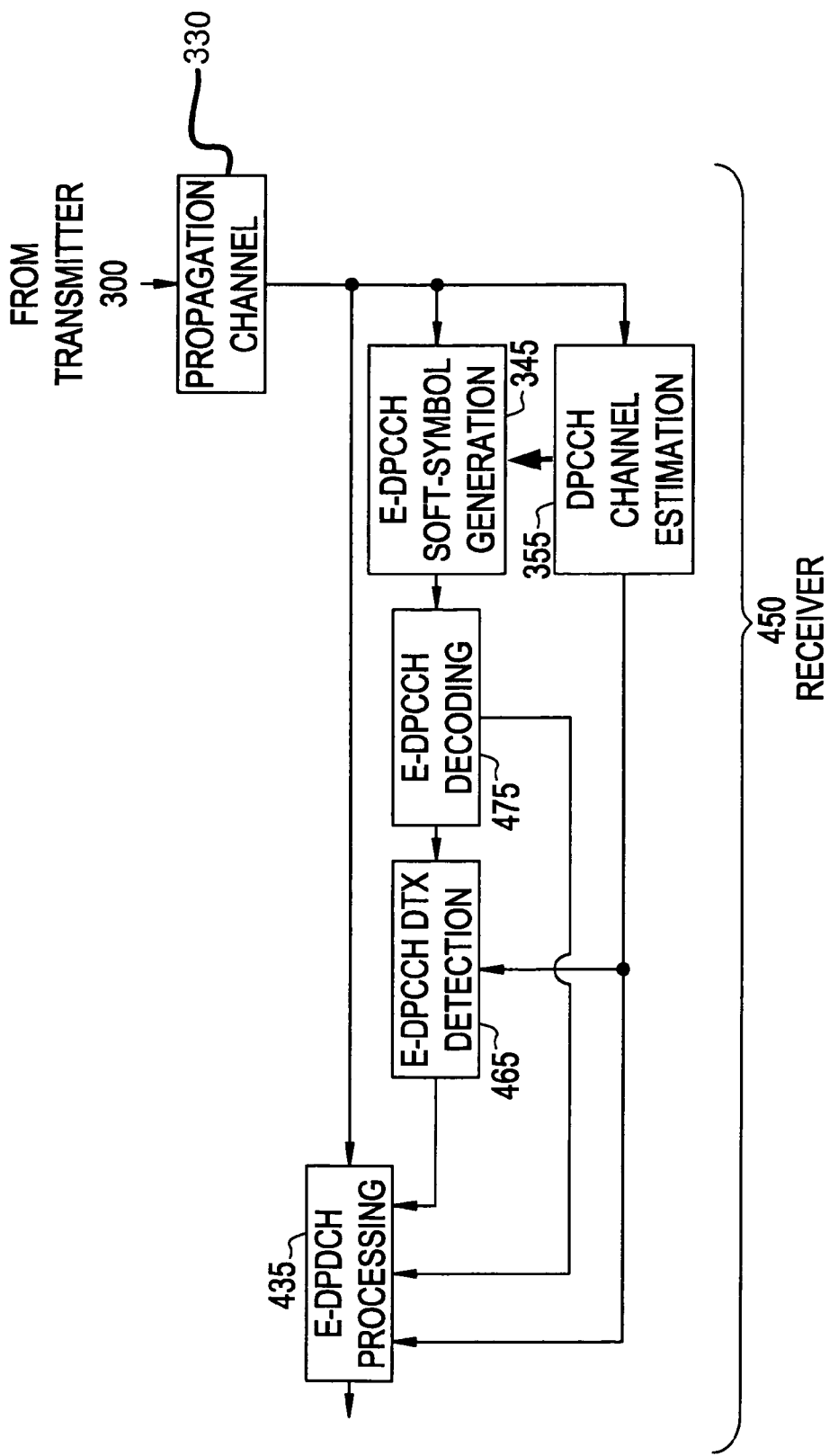
FIG. 4 illustrates a UMTS uplink receiver according to an example embodiment of the present invention.

FIG. 4 illustrates an uplink UMTS receiver 450, according to an example embodiment of the present invention. The receiver 450 shown in FIG. 4 may be located at, for example, any or all of the NodeBs 120/122/124 as shown in FIG. 1. For exemplary purposes example embodiments of the present invention will be discussed with regard to the conventional wireless system of FIG. 1; however, it will be understood that example embodiments of the present invention may be implemented in conjunction with any suitable wireless telecommunications network (e.g., UMTS, CDMA2000, etc.).

As shown in FIG. 4, a transmitted signal is received over the propagation channel 330, and input to the E-DPDCH processing block 435, E-DPCCH soft-symbol generation block 345 and a DPCCH channel estimation block 355. As is well-known in the art, the DPCCH channel estimation block 355 generates channel estimates using pilots transmitted on the DPCCH. The channel estimates may be generated in any well-known manner, and will not be discussed further herein for the sake of brevity. The channel estimates generated in the DPCCH channel estimation block 355 may be output to each of the E-DPDCH processing block 435 and the E-DPCCH soft-symbol generation block 345.

At the soft-symbol generation block 345, the received signal (e.g., received control signal) may be de-scrambled, de-spread, and de-rotated/de-multiplexed to generate a sequence of soft-symbols. The E-DPCCH soft-symbols may represent an estimate of the received signal, or in other words, an estimate of the 30 symbols transmitted by the transmitter 300. The E-DPCCH soft-symbols may be further processed to recover the transmitted E-DPCCH word.

The soft-symbols output from block 345 may be received by the E-DPCCH decoding unit 475. The E-DPCCH decoding unit 475 may generate a correlation value or correlation distance (hereinafter referred to as a correlation) between the soft-symbols (e.g., the received signal over a given frame or TTI) and each 30-bit codeword within a known codebook. Each correlation may represent a likelihood or probability that a respective 30-bit codeword has been transmitted by the transmitter 300. The known codebook may include a plurality of 30-bit codewords each corresponding to one of 1024 possible 10-bit E-DPCCH words. The number of codewords in the known codebook may be a subset (e.g., 2, 4, 8, 16, 32, etc.) of all 1024 possible E-DPCCH codewords. The codewords in the codebook may be determined in any suitable well-known manner and may be known by the UEs and NodeBs prior to transmission and reception.

The E-DPCCH decoding unit 475 may then compare each correlation to determine the highest correlation. The codeword in the codebook associated with the highest correlation being the codeword most likely transmitted by the transmitter 300. This highest correlation may be used as a decoding metric.

After determining the highest correlation and associated codeword in the codebook, the E-DPCCH decoding unit 475 may select the 10-bit word corresponding to the 30-bit codeword with the highest correlation metric. The E-DPCCH decoding unit 475 may then output the decoding metric (e.g., the highest correlation) to the E-DPCCH DTX detection unit 465 and the selected 10-bit E-DPCCH word to the E-DPDCH processing block 435.

In example operation, the E-DPCCH DTX detection unit 465 may generate an energy metric based on the decoding metric. That is, for example, the E-DPCCH DTX detection unit 465 may receive the highest correlation from the E-DPCCH decoding unit 475 and may square the highest correlation to generate an energy value. The energy value may represent the signal energy for the E-DPCCH over a given frame or TTI.

The E-DPCCH DTX detection unit 465 may also calculate the energy of the noise over the same E-DPCCH frame or TTI. The signal energy may be divided by the calculated noise energy to generate a signal-to-noise ratio or a normalized energy value for the given E-DPCCH frame or TTI. This normalized energy or signal-to-noise ratio may be used as the energy metric.

The E-DPCCH DIX detection unit 465 may then determine if a control signal has been received in the E-DPCCH frame or TTI based on the energy metric and a threshold. That is, for example, for a given E-DPCCH frame or TTI, the E-DPCCH DTX detection unit 465 may compare the energy metric with the threshold to determine whether a control signal has been received on the E-DPCCH. If the energy metric is greater than, or equal to, the threshold, the E-DPCCH DTX detection unit 465 may determine that a control signal has been received on the E-DPCCH. On the other hand, if the energy metric is less than the threshold, the E-DPCCH DTX detection unit 465 may determine that a control signal has not been received (e.g., no control signal is present) on the E-DPCCH.

The E-DPCCH DTX detection unit 465 may then output a binary DTX indicator indicating whether a control signal has been received on the E-DPCCH. The binary DTX indicator may have a binary value '1' or '0'. For example, a binary value '1' may indicate to the E-DPDCH processing block 435 that a control signal has been received on the E-DPCCH and a binary value '0' may indicate to the E-DPDCH processing block 435 that a control signal has not been received on the E-DPCCH.

If the E-DPDCH processing block 435 receives a binary DTX indicator indicating that a control signal has been received on the E-DPCCH, the E-DPDCH processing block 435 may assume that a data signal has been received over the same frame or TTI on the associated E-DPDCH. The E-DPDCH processing block 435 may then begin to process the associated E-DPDCH. On the other hand, if the binary DTX indicator indicates that no control signal (e.g., only noise) has been received over the given frame or TTI on the E-DPCCH, the E-DPDCH processing block may discard the received signal.

In example embodiments of the present invention the threshold may be dependent upon and/or proportional to the number of codewords in the codebook. That is, the greater number of codewords in the codebook, the higher the threshold. For example, a threshold determined based on a codebook having 64 codewords may be greater than a threshold determined based on a codebook having 4 codewords. As is well-known in the art, the transport format set size and/or number of transmissions for a transport channel packet transmitted on the E-DPDCH may be indicative of the codebook size (i.e., the number of codewords in the subset of codewords to be used in decoding a received signal). Thus, in example embodiments of the present invention, the smaller the transport format set size and/or maximum number of transmissions for a transport channel packet, the smaller the codebook size and, subsequently, the smaller the threshold. Accordingly, in example embodiments of the present invention, the threshold may also, or in the alternative, be determined based on a transport format set size and/or a maximum number of transmissions for a transport channel packet.

In example embodiments of the present invention, the threshold may be determined based on a false alarm probability. A false alarm may be when a codeword is detected, but no transmission by a UE has actually been received by the NodeB. A false alarm probability may be determined, for example, empirically by a network operator based on system performance requirements. The false alarm probability may be specified by a network operator, for example, at an RNC and may be passed to NodeBs within the network. In example embodiments of the present invention, a NodeB may maintain a look-up table, which may be used to convert the false alarm probability to a corresponding threshold or threshold value.

One or more example embodiments of the present invention provide a more power efficient UE, for example, by reversing the order of E-DPCCH DTX detection and E-DPCCH decoding. One or more example embodiments of the present invention provide improved system performance, for example, for 3GPP Working Group (WG) 4 to set system performance requirements, reduced interference between users, increased cell capacity, increased data throughput, increased battery life and/or increase talk/surf time.

Example embodiments of the present invention being thus described, it will be obvious that the same may be varied in many ways. Such variations are not to be regarded as a departure from the invention, and all such modifications are intended to be included within the scope of the invention.

We claim:

1. A method of detecting a signal, comprising:
   decoding, at a decoder, a control channel associated with a data channel to produce at least one decoding metric, the decoding metric representing the likelihood that a codeword among a plurality of codewords is present on the control channel;
   calculating an energy metric based on the plurality of codewords; and
   detecting, at a detector, whether a control channel signal is present on the decoded control channel based on the energy metric and a threshold, the threshold being based on a number of codewords in a codebook; wherein
      the detecting of the presence of the control channel signal on the decoded control channel is indicative of whether a data signal is present on the associated data channel.

2. The method of claim 1, wherein the decoding metric is a correlation representing the likelihood that a respective codeword among a plurality of codewords is present in a signal received on the control channel.

3. The method of claim 2, wherein the decoding metric is a highest correlation for the plurality of codewords.

4. The method of claim 3, wherein
   the energy metric is based on the highest correlation.

5. The method of claim 4, wherein the calculating step further comprises:
   squaring the highest correlation to generate an energy value; and
   normalizing the energy value to generate the energy metric.

6. The method of claim 5, wherein the normalized energy value is generated based on a signal energy and noise energy for a frame received on the control channel.

7. The method of claim 1, wherein the threshold is dependent on a number of the codewords in the plurality of codewords associated with the decoded control channel.

8. The method of claim 1, wherein the threshold is dependent on a transport format set size associated with a frame received on the decoded control channel.

9. The method of claim 1, wherein the threshold is determined based on a maximum number of transmissions for a transport channel packet.

10. The method of claim 1, wherein
    the detecting step detects that the control channel signal is present on the decoded control channel if the energy metric is greater than or equal to the threshold.

11. The method of claim 1, further comprising:
    generating an indicator indicative of whether the control channel signal is present on the decoded control channel based on the detecting step; and
    determining whether to process data received on a data channel associated with the decoded control channel based on the generated indicator.

12. The method of claim 1, wherein the data channel is an enhanced dedicated channel.

13. An apparatus for detecting a signal, comprising:
    a decoder configured to decode a control channel associated with a data channel to produce at least one decoding metric, the decoding metric representing the likelihood that a codeword among a plurality of codewords is present on the control channel; and
    a detector configured to calculate an energy metric based on the plurality of codewords and to detect whether a control channel signal is present on the decoded control channel based on the energy metric and a threshold, the threshold being based on a number of codewords in a codebook; wherein
       the detecting of the presence of the control channel signal on the decoded control channel is indicative of whether a data signal is present on the associated data channel.

14. The apparatus of claim 13, wherein the decoding metric is a correlation representing the likelihood that a respective codeword among a plurality of codewords is present in a signal received on the control channel.

15. The apparatus of claim 14, wherein the decoding metric is a highest correlation for the plurality of codewords.

16. The apparatus of claim 15, wherein the energy metric is based on the highest correlation.

17. The apparatus of claim 13, wherein the detector detects that the control channel signal is present on the decoded control channel if the energy metric is greater than or equal to the threshold.

18. The apparatus of claim 13, wherein the threshold is dependent on a number of the codewords in the plurality of codewords associated with the decoded control channel.

19. The apparatus of claim 13, wherein the threshold is dependent on a transport format set size associated with a frame received on the control channel.

20. The apparatus of claim 13, wherein the threshold is determined based on a maximum number of transmissions for a transport channel packet.

* * * * *